June 11, 1940.  F. BUECHMANN  2,203,667
RECORDING INSTRUMENT
Filed Dec. 21, 1935
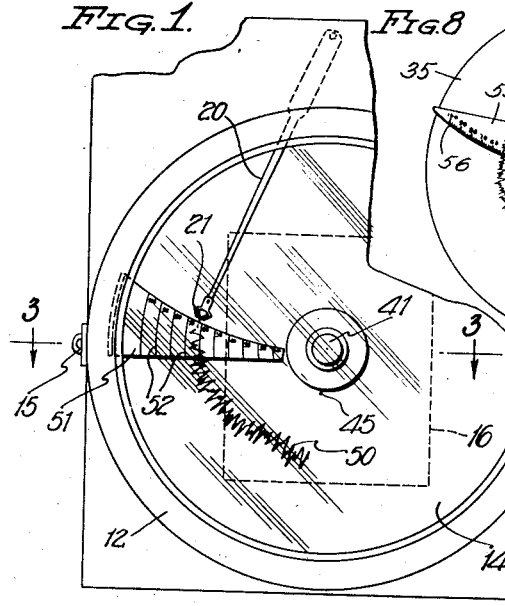
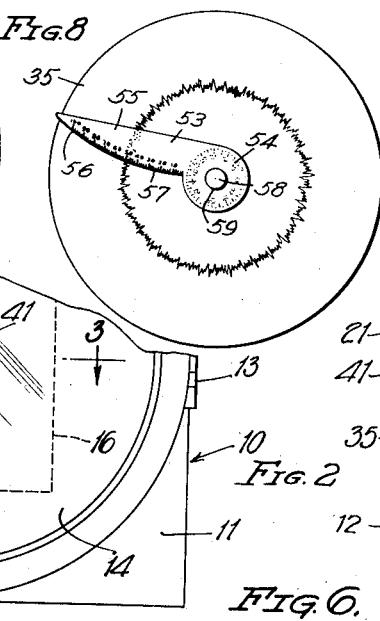
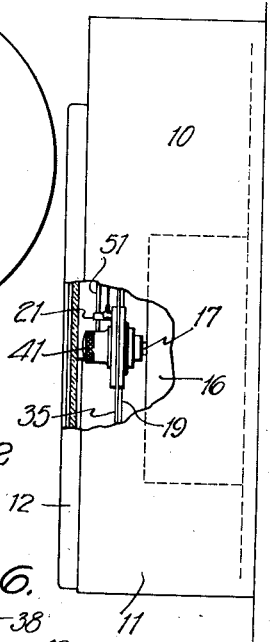
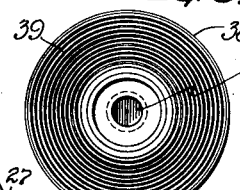
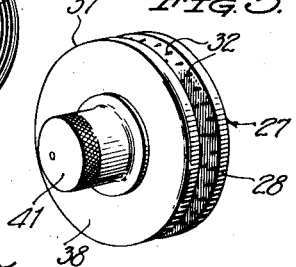
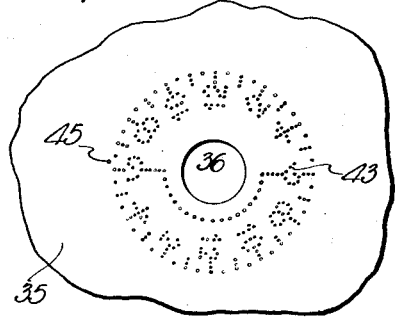
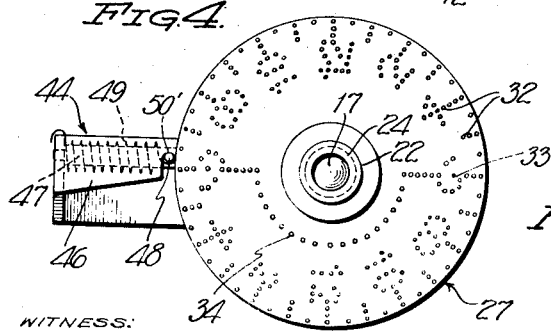
FREDERICK BUECHMANN.
INVENTOR.
BY Ely & Pattison.
ATTORNEYS.

Patented June 11, 1940

2,203,667

UNITED STATES PATENT OFFICE 2,203,667

RECORDING INSTRUMENT

Frederick Buechmann, St. Albans, N. Y.

Application December 21, 1935, Serial No. 55,516

5 Claims. (Cl. 234—63)

This invention relates to improvements in recording gauges and more particularly to time indicating gauges for recording temperatures, pressures, and the like.

One of the several features of the invention resides in a time recording gauge employing paper disk charts which enables a reader of a record shart to accurately ascertain the exact time that the chart was placed in position upon the gauge for use.

Another important feature of the invention enables the use of blank paper record disks with time pressure gauges in lieu of printed paper charts, thus saving the cost of printing.

A further object of the invention is the provision of a means for enabling the accurate reading of the chart when both on and off the gauge, even though the chart sheet or disk is lacking in the usual printed scale and time markings.

An object of the invention is to eliminate the use of charts or record sheets which heretofore have been printed prior to their insertion into the recording instrument.

With these and other objects in view, the invention resides in the certain novel contruction, combination and arrangement of parts, the essential features of which are hereinafter fully described, are particularly pointed out in the appended claims, and are illustrated in the accompanying drawings, in which:

Figure 1 is a front elevational view of a recording gauge constructed in accordance with the invention including a reading gauge for a chart in recording position.

Figure 2 is a side elevational view with part of the casing broken away.

Figure 3 is an enlarged horizontal sectional view on the line 3—3 of Figure 1.

Figure 4 is a face view of the male time punching element.

Figure 5 is a perspective view of the male and female time punching elements in separated position.

Figure 6 is a face view of the female time punching element.

Figure 7 is a fragmentary plan view of a record chart with the time markings punched therein.

Figure 8 is a plan view illustrating the method of reading the recorded markings on the chart by a different form of gauge after removal from the instrument.

I have found that printed charts or record sheets vary a great deal in accuracy due to the printing process, the cause being wear and tear on electro-type and machinery, material or paper stretch, humidity conditions and other causes. Printed charts can also be tampered with, which enables records to be produced thereon either on or off the recording instrument at will to suit an unscrupulous operator and when such tampering of a chart occurs in connection with a recording instrument for use in the treatment of milk or other foods, danger to the public health is likely.

Referring to the drawings by reference characters, the numeral 10 designates a time indicating gauge for recording pressure or temperatures, and which includes a box-like casing 11, which is provided with a circular opening in the front thereof. A circular door 12 is hinged to the casing at 13 for closing the open front of the casing when the door is in closed position, and which door has a round glass transparent panel 14 therein. Catch means 15 is provided for releasably holding the door in closed position. Fixedly supported within the rear of the casing is a clock mechanism 16 which may be of the electric or spring wound type. The driven rotatable clock shaft or arbor 17 extends forwardly within the casing and freely passes through a relatively large opening 18 provided centrally within a disk plate 19 fixedly mounted within the casing on a plane intermediate the plane of the clock mechanism 16 and door 12. Pivoted within the casing and disposed on a plane intermediate the disk plate 19 and door 12 is a recording pen 20 of the kind generally used in connection with this type of instrument, the nib end 21 of the pen being resiliently urged in the direction of the disk plate 19.

Frictionally fitted upon the shaft 17 for turning movement therewith and passing through the opening 18 is a sleeve or bushing member 22 having externally screw threaded inner and outer nipples 23 and 24 at opposite ends, an annular hub portion 25 outwardly of the threaded nipple 23, and an annular stop flange 26 adjacent the hub portion 25. Fitting upon the hub portion 25 is a male time punch element 27 which includes a flat disk body 28 of a diameter to freely fit within the opening 18. The center of the body 28 is provided with an opening to receive the hub portion 25 while the outer face side of the body 28 abuts the stop flange 26.

Fitting over the nipple 23 and bearing against the inner side of the body 28 is a disk spring washer 29 while threaded to the nipple 23 and in tight contact with the washer 29 is a nut 30 which is held against retrograde movement by a jamb nut 31 also threaded to the nipple 23. The nut 30 sets up a clamping action between the washer 29 and the stop flange 26 to secure the male punch element 27 fixed to the shaft or arbor 17 to cause the element 27 to turn therewith.

Extending from the outer face of the body 28 of the male punch element 27 are pointed pins 32. The pins are arranged to provide an annular series of radial numbers 33 denoting the even numbers of a twelve hour clock, although two series of these numbers are provided to denote the twenty four hours of a day. The series of numbers indicative of one group of twelve hours are distinguished from the other group indicative of twelve hours by a semi-circular arrangement of pins having terminal branches which radially extend to the opposite numbers 6—6 and provide a distinguishing area 34. The periphery of the front face of the disk body 28 is divided by radially disposed pins into one-half hour time intervals. The pins forming the various punch indicia are arranged in concentric alinement for a purpose to be hereinafter appreciated.

A blank paper record disk 35 has a central opening 36 punched therein to receive the stop flange 26, the paper disk fitting against the outer side of the disk plate 19 and the pins 32 of the male punch element 27. The outer face of the body 28 of the element 27 is disposed on the same plane as the outer side of the plate 19 while the pointed ends of the pins 32 project slightly beyond such plane. For forcing the paper disk 35 against the pointed end of the pins, I employ a female time punch element 37 which includes a flat disk body 38. The inner face of the body 38 is provided with a series of successive closely spaced concentric grooves 39 which receive the pointed ends of the pins to enable the inner flat surface of the body 38 to flatly contact the paper record disk 35, it being understood that the pins are concentrically alined. Swivelly connected as at 40 to the disk body 38 axially thereof is a hollow manipulating knob 41, the same being internally screw threaded as at 42 and having threading engagement with the outer threaded nipple 24. Thus, by threading the knob 41 upon the nipple 24, the paper record disk will be punched with the same time markings which are present upon the male element by reason of the piercing action of the pins 32, the punched center portion of the disk record sheet being shown in Figure 7 of the drawings and the perforated time indicia designated by the reference character 43.

It is desirous to the user of a time recording instrument of this kind to know the exact time that a paper record disk 35 is positioned within the instrument in order to accurately check the recorded matter on a record sheet from the time the sheet is placed in the machine until the time that it is removed therefrom, it being understood that after a complete revolution of the disk it sometimes occurs that the recorded matter may lap which prevents an accurate reading of the chart from one period of time to another. For this purpose I provide a piercing mechanism 44 which punches a single aperture 45 in the record sheet 35 beyond the circumferential plane of the time perforated markings 43. The time denoted by the aperture 45 is determined by its radial position relative to the radial time markings 43. The mechanism 44 is located on a substantially horizontal plane radially of the axis of the shaft 17 and includes a bracket 46 fixedly secured to the front of the clock mechanism 16. A shaft 47 is journaled in the bracket 46 and the axis of the shaft is horizontal. A piercing pin 48 has one end fixed to the shaft 47 while the opposite pointed end extends through the opening 18 in the disk plate 19 and slightly beyond the outer face of said plate. A spring 49 and stop 50' tend to normally hold the pin in a position parallel to the shaft 17. The stop 50' is formed by notching the bracket 46. The pin 48 is free to move in the direction of rotation of the disk record sheet against the action of the spring 49 to become released from the punched hole 45 after the hole has been formed by the positioning of the record sheet in clamped position between the male and female time punching elements 27 and 37 respectively. When a record sheet is removed from the instrument, the spring 49 will instantly move the piercing pin 48 to its piercing position.

In view of the use of a blank record sheet 35, I provide means by which the irregular graphic line 50 inscribed thereon by the nib 21 of the recording pen 20 may be read while the record disk sheet 35 is in recording position within the instrument. For this purpose, there is provided a horizontally disposed transparent gauge 51 mounted on the door 12. The gauge 51 is positioned on a plane just below the plane of the path of movement of the nib 21 of the recording pen 20, the top edge of the gauge being curved on an arc struck from the pivotal axis of the recording pen, and a straight horizontal lower edge. The gauge is formed with transversely disposed graduations 52 extending from the curved edge to the straight edge, the said graduations being curved on an arc struck from the axis of the shaft 17. By this construction and arrangement of parts, the present graphic line being inscribed by the nib of the recording pen may be accurately read by the relative position of the same with respect to the graduations on the gauge. The graduations are identified by numbers to denote a particular scale depending upon the particular use of the instrument.

In Figure 8 I have shown a gauge device 53 by which the recorded irregular graphic line 50 may be accurately read after the record disk sheet 35 is removed from the instrument, which removal is accomplished by opening the door 12 and unscrewing the female time punch element 37. The gauge device 53 comprises a flat transparent body of Celluloid or like substance having a circular head 54 and a blade portion 55 extending from the head. One side of the blade is straight and the opposite edge convexly curved as at 56 and along which curved edge are arranged spaced graduations 57 indicative of a particular scale to denote pressure or temperature depending upon whether the instrument is employed for recording pressure or temperatures. Fixedly mounted in the circular head 54 axially thereof is a manipulating knob 58 having a hub portion 59 extending beyond the inner face of the head and which is of a size to snugly fit into the opening 36 of the record disk. By placing the hub portion 59 in the opening 36 with the right side of the record disk face up, the manipulating knob 58 may be manually turned relative to the disk and the blade of the gauge brought into reading relation to the graphic line 50. The time markings 43 and 45 are readable through the head 54 and are read radially with respect to the inner end of the curved graduated edge 55 of the blade.

By the construction and arrangement of the parts hereinbefore described and their relative positions, it is possible to eliminate the use of printed record charts for graphic time recording instruments, for the graphic line inscribed upon the blank record sheet 35 may be accurately read at all times. Furthermore, it is possible to accurately determine by means of the perforations 45 the exact time that a record disk sheet was positioned within the instrument.

Having thus described the invention, what I claim as new and desire to secure by Letters Patent of the United States is:

1. In a recording instrument of the class described having a clock shaft, the combination of a pair of separable coacting disk-like punch elements, one of said punch elements including circumferentially alined piercing pins arranged in clock dial formation, the other of said punch elements having circumferential grooves for receiving said piercing pins, one of said punch elements being fixedly secured to said clock shaft and the other punch element being carried by said clock shaft but rotatable relative to the other punch element.

2. In an instrument of the class described, a clock mechanism having a time shaft, a disk-like male punch element fixedly carried by said time shaft having circumferentially concentric piercing pins arranged in clock dial formation to indicate intervals of time, and a disk-like female punch element rotatably supported axially with respect to said shaft and rotatable relative thereto and having circumferentially arranged grooves on the inner face thereof for receiving said piercing pins when the female punch element is rotatably brought into coacting clamping relation with said male punch element when a paper record disk is interposed therebetween.

3. In a graph recording instrument having a clock driven shaft, the combination of a sleeve member fixed to said shaft, a male die element having circumferentially concentric piercing pins arranged in clock dial formation indicative of hours of time, said male die element being fixed to said sleeve member, a female die element threaded to said sleeve member, said female die element having circumferentially arranged grooves on the inner face thereof for receiving said circumferentially arranged piercing pins when the female die element is screwed into clamping relation with respect to the male die element and between which elements a paper record disc is adapted to be interposed.

4. In a recording instrument of the class described having a clock shaft, the combination of a male punch element fixed to said clock shaft adjacent one end thereof, said male punch element comprising a disk body, concentric rows of circumferentially alined piercing pins mounted on said body and extending outwardly therefrom and arranged in clock dial formation, a female punch element threadedly connected to the end of said clock shaft and comprising a disk body having spaced circumferential grooves in the inner face thereof to receive the rows of piercing pins, and a manipulating knob extending from the outer side of the body of the female punch element to facilitate the rotation of said female punch element when threaded to said shaft, whereby a paper sheet may be interposed and clamped between said punch elements to receive the punching of said piercing pins and be held to rotate with said clock shaft.

5. In combination with a recording instrument having a clock shaft, a sleeve member fixed to one end of said shaft and having a reduced externally screw threaded nipple at the outer end thereof, a male punch element fixed to said sleeve inwardly of the threaded nipple, said male punch element comprising a disk body, concentric rows of circumferentially alined piercing pins mounted on said body and extending from the outer face thereof and arranged in predetermined symbol forming relation, and a female punch element threaded to said threaded nipple for movement toward and away from said male punch element, said female punch element including a disk body having spaced circumferential grooves in the inner face thereof which are complementary to the circular rows of piercing pins to receive the same when said female punch element is threaded into close proximity to the outer face of said male punch element, substantially as and for the purpose specified.

FREDERICK BUECHMANN.